US005642636A

United States Patent [19]

Mitsui

[11] Patent Number: 5,642,636

[45] Date of Patent: Jul. 1, 1997

[54] LOCKING DEVICE FOR TRUNK LIDS

[75] Inventor: Jiro Mitsui, Kofu, Japan

[73] Assignee: Mitsui Kinzoku Kogyo Kabushiki Kaisha, Tokyo, Japan

[21] Appl. No.: 679,010

[22] Filed: Jul. 12, 1996

Related U.S. Application Data

[63] Continuation of Ser. No. 184,214, Jan. 21, 1994, abandoned.

[30] Foreign Application Priority Data

| | | | |
|---|---|---|---|
| Jan. 22, 1993 | [JP] | Japan | 5-004845 U |
| Jan. 29, 1993 | [JP] | Japan | 5-006631 U |
| Mar. 23, 1993 | [JP] | Japan | 5-088213 |

[51] Int. Cl.$^6$ B60R 25/00; E05C 17/44

[52] U.S. Cl. 70/237; 70/264; 292/201; 292/216; 292/DIG. 56; 292/DIG. 43

[58] Field of Search 70/237, 239–241, 70/263, 264, 275, 277, 279; 292/201, 216, 341.12, 341.15–341.17, DIG. 23, 38, 43, 56

[56] References Cited

U.S. PATENT DOCUMENTS

| | | | |
|---|---|---|---|
| 3,705,738 | 12/1972 | Yoshimura | 292/341.12 X |
| 4,322,959 | 4/1982 | Mochida | 70/241 |
| 4,358,141 | 11/1982 | Hamada | 292/DIG. 38 X |
| 4,364,249 | 12/1982 | Kleefeldt | 70/264 |
| 4,452,058 | 6/1984 | Noel | 292/216 X |
| 4,538,845 | 9/1985 | Yamada | 292/DIG. 38 X |
| 4,756,564 | 7/1988 | Ikeda | 292/DIG. 56 X |
| 4,763,936 | 8/1988 | Rogakos et al. | 292/201 |
| 4,783,103 | 11/1988 | Schlegel | 292/341.12 X |
| 4,856,829 | 8/1989 | Nakamura et al. | 292/DIG. 56 X |
| 4,962,955 | 10/1990 | Ferrara et al. | 292/DIG. 43 X |
| 4,974,886 | 12/1990 | Kleefeldt et al. | 292/216 X |
| 4,976,477 | 12/1990 | Nakao | 292/DIG. 43 X |
| 5,020,838 | 6/1991 | Fukumoto | 292/216 X |
| 5,238,274 | 8/1993 | Becker et al. | 292/216 X |
| 5,273,324 | 12/1993 | Kobayashi | 292/216 X |
| 5,277,461 | 1/1994 | Dzurko et al. | 292/216 |
| 5,288,115 | 2/1994 | Inoue et al. | 292/201 |
| 5,295,374 | 3/1994 | Bender et al. | 70/264 X |
| 5,348,357 | 9/1994 | Konchan et al. | 292/DIG. 56 X |

FOREIGN PATENT DOCUMENTS

| | | | |
|---|---|---|---|
| 59276 | 3/1991 | Japan | 292/DIG. 23 |
| 3-58571 | 6/1991 | Japan . | |
| 845696 | 8/1960 | United Kingdom . | |
| 2213192 | 8/1989 | United Kingdom | 292/DIG. 56 |

*Primary Examiner*—Suzanne Dino
*Attorney, Agent, or Firm*—Browdy and Neimark

[57] ABSTRACT

A locking device for trunk lids comprises a latch for engaging with a striker, a ratchet for maintaining the engagement between the latch and the striker, an output member rotating by an electric motor against resilient force of a return spring, a moving bar provided between the ratchet and the output member so as to slide in a lateral direction, the moving bar having one end connected to the output member and the other end connected to a key cylinder, an engaging portion provided with the moving bar for engaging with the ratchet to release the ratchet from the latch when the moving bar laterally slides from an original position by the rotation of the output member or the key cylinder. The moving bar is restored to the original position by the resilient force of the return spring after the ratchet is disengaged from said latch.

6 Claims, 5 Drawing Sheets

FIG. 2
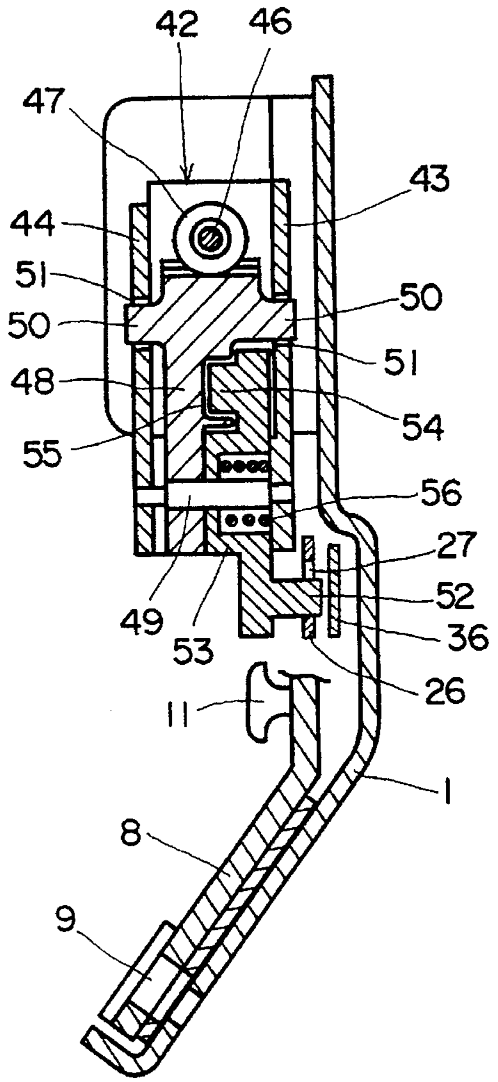
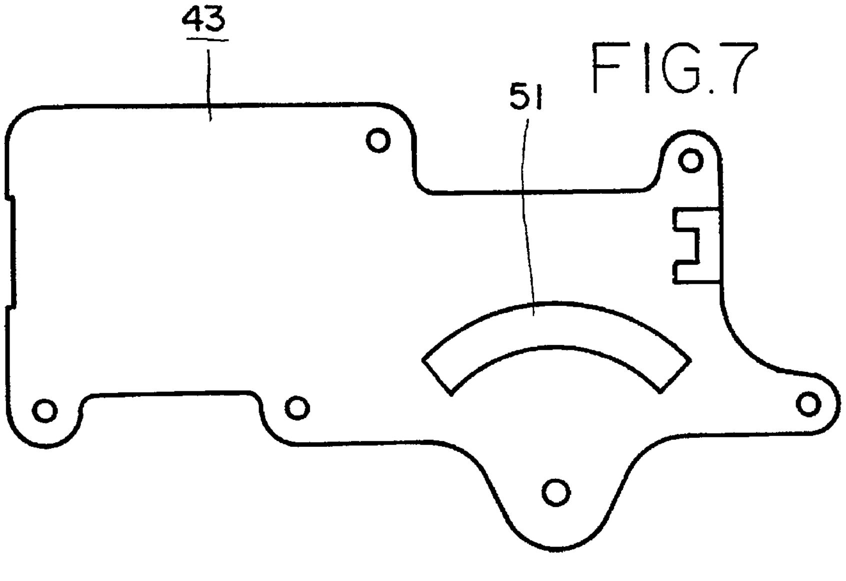
FIG. 7

LOCKING DEVICE FOR TRUNK LIDS

This application is a continuation of application Ser. No. 08/184,214, filed Jan. 21,1994 now abandoned.

BACKGROUND OF THE INVENTION

1. Field of the Invention

The present invention relates to a locking device for trunk lids.

2. Background Art

Japanese Utility Model Application Laid-open No. 58571-1991 known publicly describes a locking device for trunk lids which comprises a latch rotatably mounted on a base plate for engaging with a striker; a ratchet rotatably mounted on the plate for engaging the latch; a motor being given electricity by an operation of a switch provided in the vicinity of a driver's seat; an output member releasing the ratchet from the latch when it rotates against the resilient force of a return spring by the motor; and a moving bar having one end connected to the ratchet and the other end connected to a key cylinder, said bar releasing the ratchet from the latch by the rotation of the key cylinder.

Above-mentioned publicly known example is constituted such that the moving bar having moved due to the key cylinder is restored by the return spring provided at the key cylinder side. Therefore, in addition to the return spring for the output member, one more return spring is required.

SUMMARY OF THE INVENTION

Thus, the present invention is constituted so that a return spring for an output member also serves both as a spring for reverting a moving bar. However, even in the case of such constitution, the resilient force of the return spring for the output member is occasionally defeated by the resistance of movement of the moving bar. In such a case, as in the publicly known example, a return spring is also attached to a key cylinder side, however, owing to the presence of the resilient force of the return spring for the output member, one which is sufficiently small can be used for this return spring.

In addition, the present invention is the one in which the operation of a motor due to an operation switch in a vehicle has been made impossible using a simple constitution, and has made it impossible to open a trunk lid without a key.

In addition, the present invention is the one in which occurrence of noises during engagement and disengagement of a latch and a ratchet has been prevented.

BRIEF DESCRIPTION OF THE DRAWING

Other features and advantages of the invention will be apparent from the following description taken in connection with the accompanying drawings wherein:

FIG. 2 is a cross-sectional view of a locking device;

FIG. 7 is a front view of a plate of an actuator unit;

DESCRIPTION OF THE PREFERRED EMBODIMENT

Figure 1:
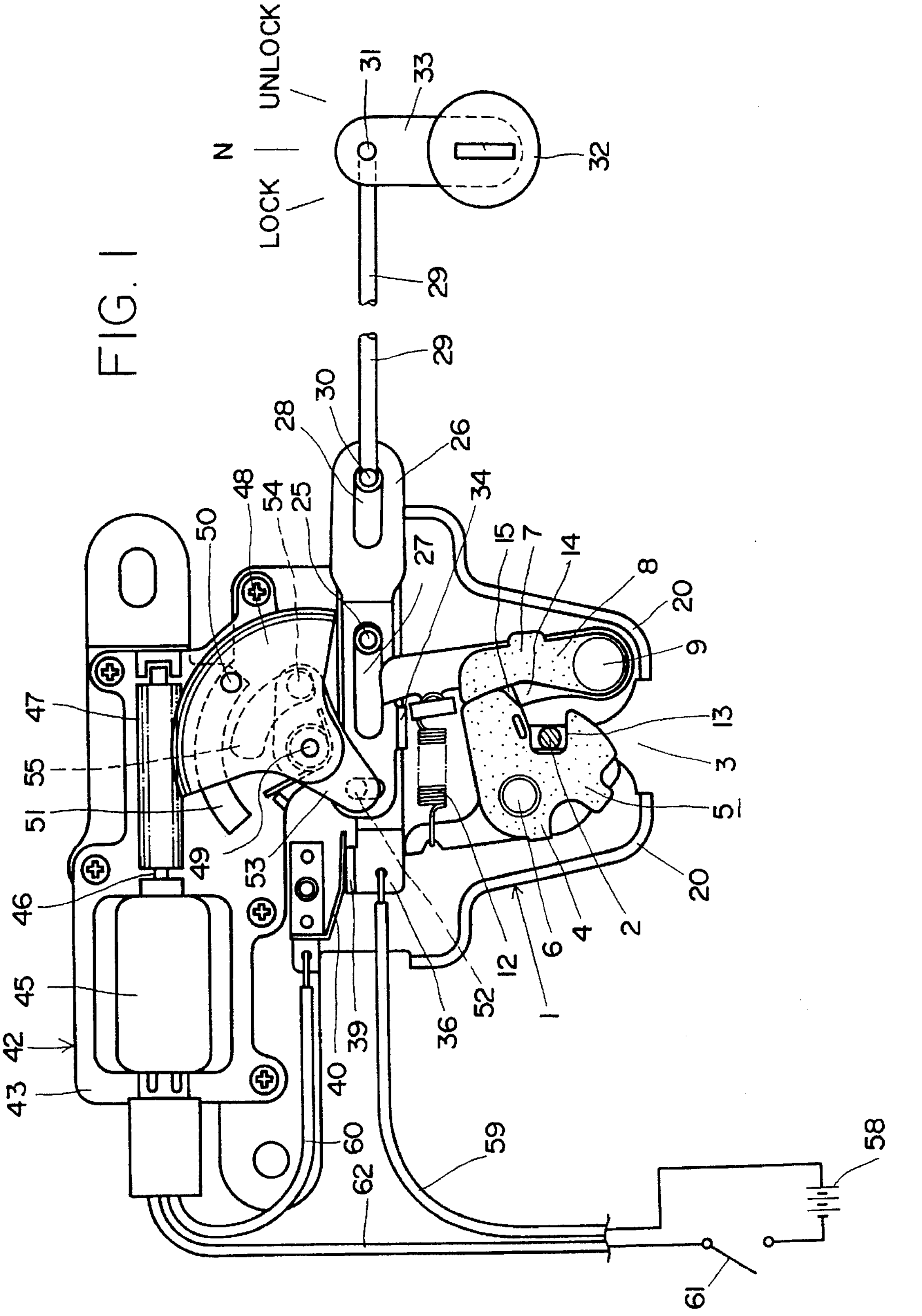
FIG. 1 is a front view as a whole of a locking device according to the present invention.
Figure 3:
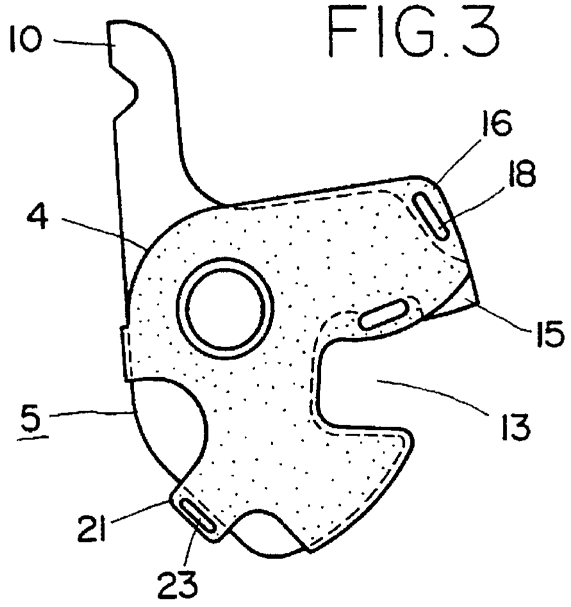
FIG. 3 is a front view of a latch.
Figure 4:
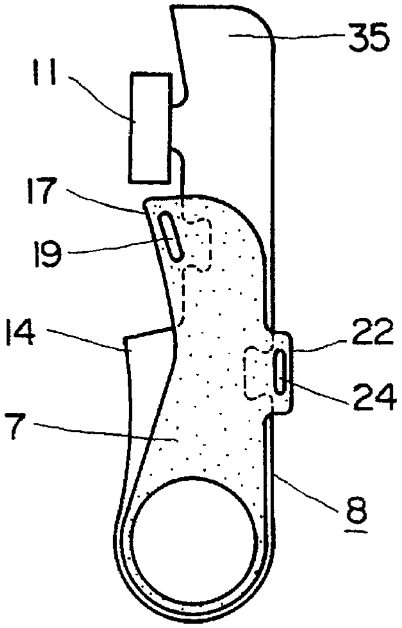
FIG. 4 is a front view of a ratchet.
Figure 5:
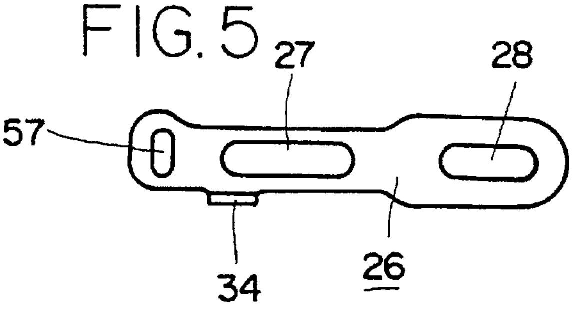
FIG. 5 is a front view of a moving bar.
Figure 8:
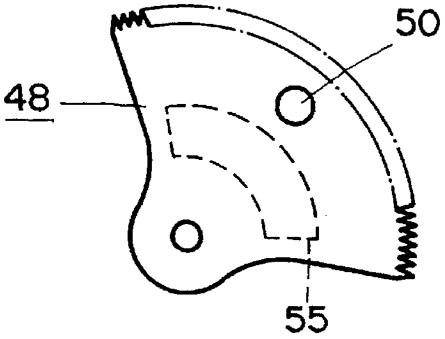
FIG. 8 is a front view of a segment gear.
Figure 6:
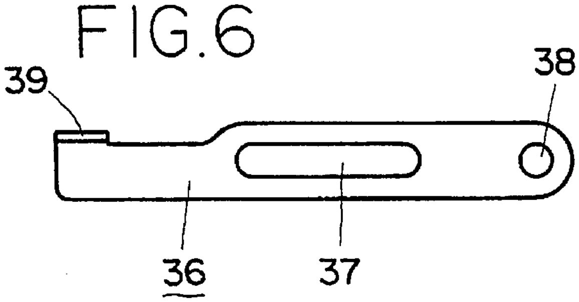
FIG. 6 is a front view of a switch lever.
Figure 9:
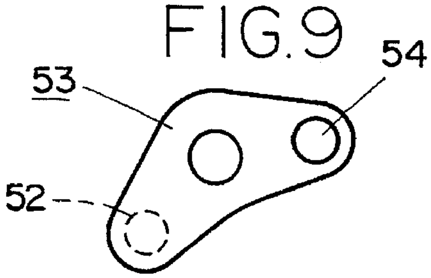
FIG. 9 is a front view of a linking lever.

In the illustrative embodiment of the invention as disclosed in the drawings, a base plate 1 of a locking device according to the present invention has at its lower position a groove 3 into which a striker 2 enters. Either of the plate 1 or the striker 2 is secured to a trunk lid, and the other is secured to a vehicle body. A metallic latch 5 covered with a cover 4 made of synthetic resin is rotatably mounted by a shaft 6 at the left side of the groove 3 of the base plate 1 for engaging with the striker. A metallic ratchet 8 covered with a cover 7 made of synthetic resin is rotatably mounted by a shaft 9 at the right side of the groove 3 of the base plate 1 for preventing the latch 5 from reverse rotation by engaging with the latch 5.

Figure 10:
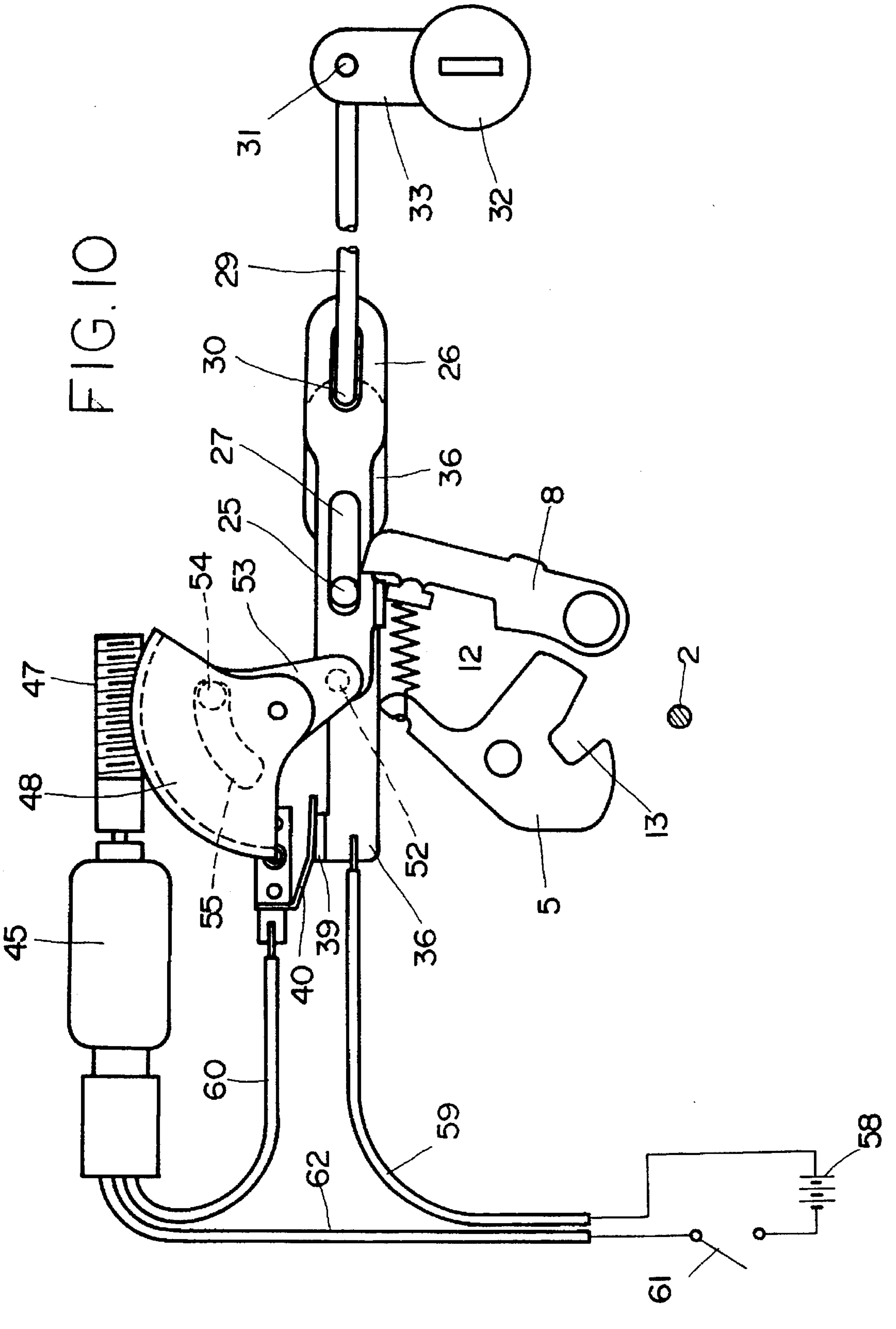
FIG. 10 is a view for explaining a state where a motor has been operated.

A spring 12 is provided between a leg portion 10 of the latch 5 and a projection 11 of the ratchet 8. When the striker 2 engages with a fork portion 13 of the latch 5, the latch 5 rotates counterclockwise in FIG. 10 against the resilient force of the spring 12 to get the position in FIG. 1, and when it reaches in this state, a pawl 14 of the ratchet 8 engages with a step portion 15 of the latch 5, and rotation of latch 5 to an unbiased position is prevented.

The latch cover 4 and the ratchet cover 7 have first cushion portions 16 and 17, respectively, which abut with each other when the step portion 15 engages with the pawl 14. Owing to the mutual abutment of the cushion portions, the occurrence of pulse sounds when the ratchet 8 engages with the latch 5 by the resilient force of the spring 12 is suppressed. Further, when space portions 18 and 19 are respectively formed at the cushion portions 16 and 17, the pulse vibration is effectively absorbed, and the silencing effect is further improved.

When the latch 5 is released from the engagement with the ratchet 8, the latch 5 rotates clockwise by the resilient force of the spring 12 to an unbiased position and abuts against a circumferential wall 20 of the plate 1. In order to prevent the occurrence of noises due to the abutment, a second cushion portion 21 abutting against the circumferential wall 20 is integrally formed at the latch cover 4. The ratchet 8 does not abut against the circumferential wall 20 because it is energized in the counterclockwise direction in FIG. 1 by the resilient force of the spring 12. However, when the ratchet 8 is released from the latch 5, it is flipped extremely strongly by the latch 5, rotates clockwise against the resilient force of the spring 12, and collides against the circumferential wall 20. Therefore, a second cushion portion 22 abutting against the circumferential wall 20 is also integrally formed at the ratchet cover 7. In addition, space portions 23 and 24 for absorbing vibration are also provided at each of the second cushion portions 21 and 22.

A guide pin 25 is secured at about the middle between top and bottom of the base plate 1. The pin 25 is engaged with an elongated hole 27 which is formed at a central portion of a laterally long moving bar 26. The bar 26 has at its right end another elongated hole 28 with which a left end 30 of a rod 29 is engaged. A right end 31 of the rod 29 is linked to a rotating lever 33 of a key cylinder 32 attached to the trunk lid or the vehicle body.

A folded portion 34 is provided with the moving bar 26. When the moving bar 26 slides rightward in FIG. 1, the folded portion 34 engages with a leg portion 35 of the ratchet 8 and make the ratchet 8 rotate clockwise.

A switch lever 36 is arranged at the back side of the moving bar 26. The switch lever 36 has an elongated hole 37 which is slightly longer than the elongated hole 27 of the moving bar 26. The pin 25 also passes through the elongated hole 37. The switch lever 36 has at its right end a circular hole 38 with which the left end 30 of the rod 29 engages. A bent portion 39 is provided at a left end of the switch lever 36. The lever 36 and the bent portion 39 are formed with conductive metal. A switch 40 is arranged at a position in the vicinity of the bent portion 39. When the rotating lever 33 is at a neutral position or an unlock position, the bent portion 39 of the switch lever 36 abuts against the switch 40, and the bent portion 39 and the switch 40 become in continuity state. However, when the rotating lever 33 becomes in lock position, the bent portion 39 separates from a switch arm 41.

An actuator unit 42 is attached at an upper portion of the base plate 1. The unit 42 has a pair of plates 43, 44 by leaving a predetermined space, and an electric motor 45 is secured between the plates 43 and 44. A worm gear 47 which is secured to an output shaft 46 of the motor 45 is meshed with a segment gear 48. The segment gear 48 is rotatably supported to the plates 43, 44 by a shaft 49. Projections 50, 50 are formed at the both side of the segment gear 48, and the projections 50, 50 are inserted into circular arc grooves 51, 51 formed at the plates 43, 44.

A boomerang-shaped linking lever 53 is rotatably supported by the central shaft 49. A pin 54 formed at one end of the linking lever 53 is engaged with a circular arc groove 55 which is formed at the segment gear 48 using the central shaft 49 as a center. The linking lever 53 is urged in the clockwise direction in FIG. 1 by means of a return spring 56. Force of the return spring 56 is transmitted to the segment gear 48 through the pin 54 of the linking lever 53, and when the motor 45 is not driven, the segment gear 48 is stopped by the abutment of the projections 50 against right ends of the grooves 51. A projection 52 is formed at the other end of the linking lever 53, and the projection 52 is engaged with an elongated hole 27 formed at a left end of the moving bar 26. Therefore, the resilient force of the return spring 56 is also transmitted to the moving bar 26.

58 illustrated in FIG. 1 is a battery loaded on the vehicle. The switch lever 36 and one side terminal of the battery 58 are connected with a cord 59. The switch 40 and one side terminal of the motor 45 are connected with a cord 60. When the switch 40 contacts with the bent portion 39 of the switch lever 36, one side terminal of the battery 58 and one side terminal of the motor 45 are electrically connected. The other terminal of the battery 58 is connected to an operation switch 61 provided in the vicinity of a driver's seat, and the operation switch 61 is connected to the other terminal of the motor 45 with a cord 62.

OPERATION

When the trunk lid is closed by hands, the striker 2 engages with the fork portion 13 of the latch 5, and rotates the latch 5 counterclockwise against the resilient force of the spring 12. When the latch 5 rotates up to the predetermined position, the ratchet 8 energized by the spring 12 rotates counterclockwise, thereby the first cushion portion 17 of the ratchet cover 7 abuts against the first cushion portion 16 of the latch cover 4, and the ratchet 8 stops, and thereafter when the latch 5 reversely rotates by the force of the spring 12, the step portion 15 engages with the pawl 14 of the ratchet 8, resulting in the state in FIG. 1. In such a manner, when the ratchet 8 rotates by the resilient force of the spring 12, the cushion portions 16 and 17 having sufficient elasticity mutually collide, so that the pulse sound is considerably reduced.

When the key cylinder 32 is rotated clockwise in FIG. 1 by a key for opening the trunk lid, the moving bar 26 guided by the guide pin 25 through the rod 29 moves to the right, then the folded piece 34 of the moving bar 26 engages with the leg portion 35 of the ratchet 8 to release the ratchet 8 from the latch 5, thereby the door can be opened. At this time, the projection 52 of the linking lever 53 is connected to the elongated hole 27 of the moving bar 26, so that the linking lever 53 rotates counterclockwise against the resilient force of the spring 56. However, the pin 54 of the linking lever 53 merely moves in the circular arc groove 55 of the segment gear 48, and the segment gear 48 does not rotate.

In addition, when the ratchet 8 is released from the latch 5, it is strongly flipped by the latch 5 and rotates clockwise in FIG. 1, however, the second cushion portion 22 of the ratchet cover 7 collides against the circumferential wall 20, so that no noise is generated.

Thus, after performing the door opening operation as described above, the linking lever 53 and the moving bar 26 are reverted into the state in FIG. 1 by the resilient force of the return spring 56, and the key cylinder also returns to the neutral position.

On the other hand, when the operation switch 61 in the vehicle is turned on for opening the trunk lid in the state of FIG. 1, electric current flows from the battery 58 to the motor 45 because the bent portion 39 contacts with the switch 40, then the segment gear 48 rotates counterclockwise in FIG. 1 by the motor 45. Thereby the linking lever 53 also rotates counterclockwise through the pin 54 engaging with the circular arc groove 55 of the segment gear 48, having the moving bar 26 slide rightward through the pin 52, the folded piece 34 of the moving bar 26 engages with the leg portion 35 of the ratchet 8 to disengage the ratchet 8 from the latch 5, and the door can be opened.

Figure 11:
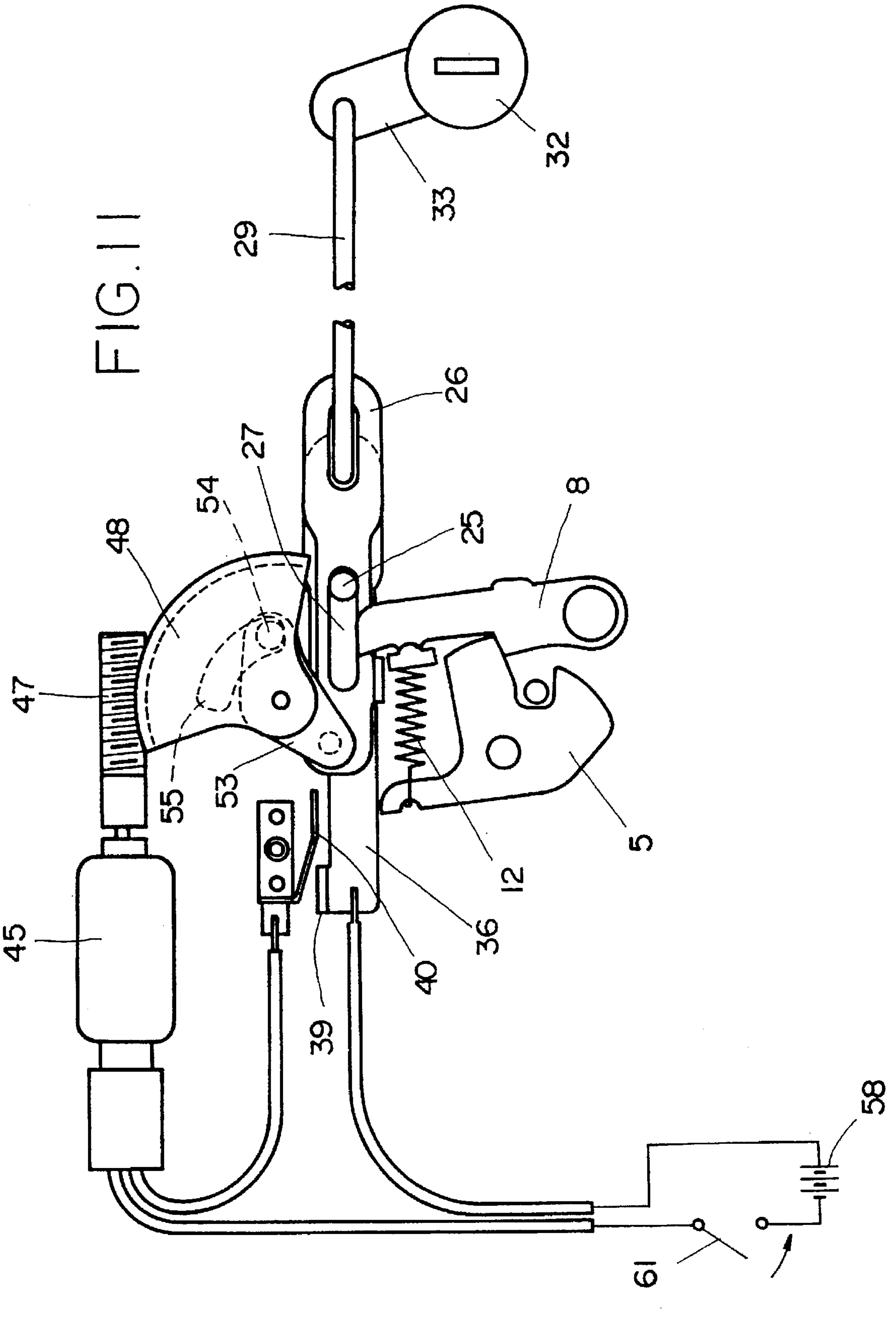
FIG. 11 is a view for explaining a state where a circuit of motor has been cut.

In the state in FIG. 1, when the key is inserted into the key cylinder 32, the rotatable lever 33 is moved to the lock position, and the key is pulled out exactly as it is, then the switch lever 36 with which the left end 30 of the rod 29 engages slides leftward as in FIG. 11, resulting in the state in which the bent portion 39 of the switch lever 36 is separated from the switch 40. In this state, even when the operation switch 61 in the vehicle is operated, no electric current is supplied to the motor 45, so that it becomes impossible to open the trunk lid without the key.

What is claimed is:

1. A locking device for trunk lids comprising:

a base plate having a circumferential wall;

a latch rotatably mounted on the base plate for engaging with a striker, said latch having a step portion;

a ratchet rotatably mounted on the base plate and having a pawl for engaging with the step portion of said latch;

a spring provided between said latch and said ratchet; and a ratchet cover substantially covering said ratchet and having a first cushion portion and a second cushion portion with sufficient elasticity;

wherein said first cushion portion collides against said latch before said pawl engages with said step portion, and said second cushion portion collides against said circumferential wall when said ratchet is released from said latch;

wherein said first cushion portion and said second cushion portion are respectively arranged on opposite sides of said ratchet.

2. The device according to claim 1, further comprising a latch cover substantially covering said latch and having a third cushion portion which abuts against said first cushion portion before the pawl of said ratchet collides against the step portion of said latch.

3. The device according to claim 2, wherein said latch cover has a fourth cushion portion for abutting against said circumferential wall.

4. A locking device for trunk lids comprising:

a base plate;

a latch rotatably mounted on the base plate for engaging with a striker;

a ratchet rotatably mounted on the base plate for maintaining the engagement between the latch and the striker by engaging with the latch;

an output member mounted on the base plate, said output member being rotatable between a first position and a second position;

a return spring for returning the output member to the first position from the second position;

an electric motor for rotating the output member toward the second position against a resilient force of the return spring;

an elongated moving bar provided between the ratchet and the output member, said elongated moving bar having one end connected to the output member and the other end connected to a key cylinder and being slidable parallel to a longitudinal axis of the elongated moving bar only in a single straight line between an initial position and an operating position by rotation of the output member or the key cylinder; and an engaging portion provided with the elongated moving bar for engaging with the ratchet to release the ratchet from the latch when the elongated moving bar slides from the initial position to the operating position by the rotation of the output member or the key cylinder;

wherein said elongated moving bar is returned to the initial position by the resilient force of the return spring after the ratchet is disengaged from the latch.

5. The device according to claim 4, further comprising a linking lever provided between the elongated moving bar and the output member, wherein said return spring returns the output member and the elongated moving bar to the first position and the initial position, respectively, through the linking lever, wherein said output member does not rotate when said elongated moving bar slides toward the operating position by the rotation of the key cylinder.

6. The device according to claim 5, further comprising a switch lever which moves when said key cylinder is rotated in a reverse direction, and a switch for making the operation of said motor impossible when the switch lever moves.

* * * * *